June 12, 1956  R. M. DENSMORE  2,749,886
FLUID PRESSURE SELF-RECIPROCATING ACTUATOR
Filed June 7, 1954  2 Sheets-Sheet 2

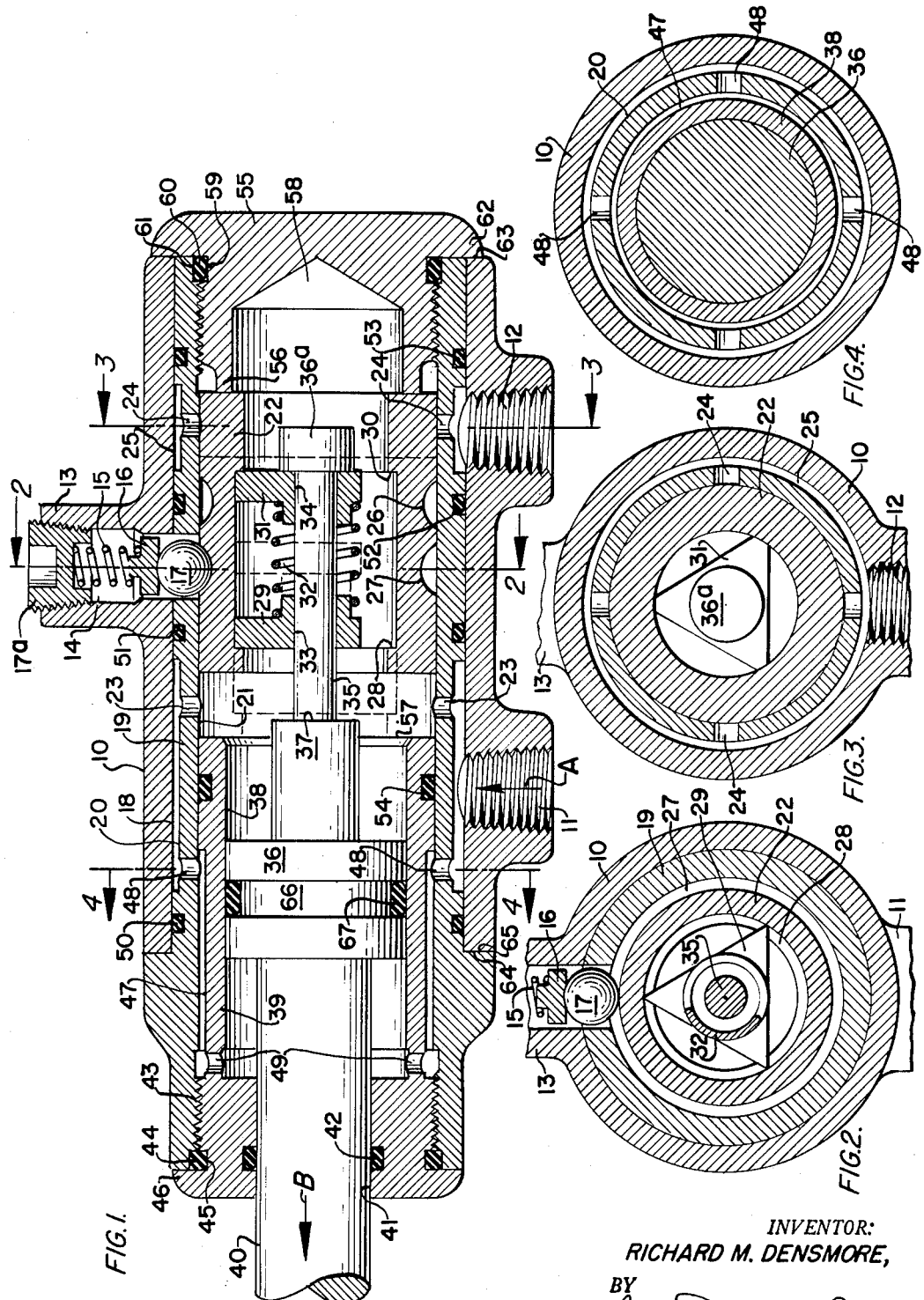

INVENTOR:
RICHARD M. DENSMORE,
BY
George Douglas Jones
ATTORNEY.

United States Patent Office 2,749,886
Patented June 12, 1956

2,749,886

FLUID PRESSURE SELF-RECIPROCATING ACTUATOR

Richard M. Densmore, Los Angeles, Calif.

Application June 7, 1954, Serial No. 434,794

10 Claims. (Cl. 121—164)

This invention relates to a fluid pressure self-reciprocating actuator.

According to the present invention, a cylinder and casing structure completely encloses the entire operating mechanism of the present fluid pressure self-reciprocating actuator whereby the piston and alternating valve structure is completely bathed in fluid which operates the motor and all of the moving parts thereof are automatically cooled and lubricated continuously.

The working piston of the reciprocating actuator according to the present invention may be provided with opposing surfaces of varying area whereby power delivered in connection with the piston may be equal in both reciprocating directions thereof or may be different according to predetermined dimensions of the piston and its rod portion.

The present self-reciprocating actuator may be employed in a great variety of uses as desired. For example, it may operate the sickle bar of a mowing machine, it may operate the plunger of a pump, or may be employed in some installations in connection with a crank pin to produce rotary motion where other forms, such as electrical motors or internal combustion engines, cannot be used due to their fire hazards.

The reciprocating actuator as disclosed in this application may have many uses which require the application of an efficient fluid operated prime mover.

Various fluids may be employed under pressure to operate this reciprocating actuator and may be either pneumatic, hydraulic, or may be hydro-pneumatic, wherein hydraulic fluid is driven from an accumulator for the purpose of providing a cushioned stroking action of the operating piston of the actuator.

It is an object of the present invention to provide a fluid pressure self-reciprocating actuator wherein the piston, alternating valve, and all movable mechanism are contained in a unitary structure and thoroughly cooled and lubricated by the operating fluid which passes therethrough.

Another object of the invention is to provide a novel arrangement of valve cylinder and casing structure for containing the operating piston and alternating valve of the actuator.

Another object of the invention is to provide a fluid pressure self-reciprocating actuator which is readily adapted to operation by various fluids and which may be cycled at a very high rate of speed.

Another object of the invention is to provide a reciprocating actuator having very simple and reliable piston and alternating valve actuating linkage.

Another object of the invention is to provide a reciprocating actuator having novel features of construction which greatly facilitate and simplify fabrication and production of a fluid operated reciprocating actuator.

A further object of the invention is to provide a fluid pressure self-reciprocating actuator wherein opposing surfaces of the operating piston may be proportionally different relative to each other to attain desired operating force in either reciprocal direction of the piston in relation to the pressure of the fluid operating the same.

A still further object of the invention is to provide a reciprocating actuator which is readily adaptable to numerous prime mover applications.

An additional object of the invention is to provide a fluid pressure self-reciprocating actuator which is very simple in its mode of operation, durable, and which is very powerful in proportion to its size and the pressure of fluid operating the same.

These and other objects will be apparent from the following specification, appended claims and accompanying drawings in which:

Fig. 1 is a longitudinal axial section of the fluid pressure self-reciprocating actuator in accordance with the present invention and disclosing parts and portions thereof in elevation to facilitate the illustration;

Fig. 2 is a fragmentary transverse sectional view of the fluid pressure self-reciprocating actuator taken from line 2—2 of Fig. 1;

Fig. 3 is a fragmentary transverse sectional view taken from line 3—3 of Fig. 1;

Fig. 4 is a transverse sectional view taken from line 4—4 of Fig. 1;

Figure 5:
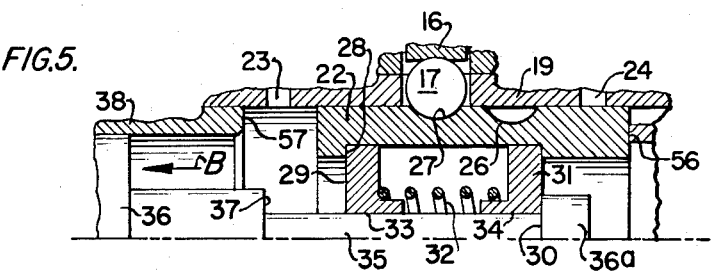
Fig. 5 is a fragmentary sectional view taken on the same plane as Fig. 1 showing a relative operating position of the actuator piston and alternating valve of the fluid pressure self-reciprocating actuator.

In the fluid pressure self-reciprocating actuator, as shown in Fig. 1 of the drawings, an external cylindrical conduit casing 10 is provided with a fluid pressure inlet port 11 which is internally screw-threaded and adapted to be fitted with a tubular connection to a source of high pressure fluid. The conduit casing 10 is also provided with an outlet port 12 which is internally screw-threaded and adapted to be provided with a fitting connecting it to an exhaust tube arranged for the return of fluid to the original fluid pressure source or to any other exhaust location.

Integral with the conduit casing 10 is a cylindrical projection 13 having a central bore 14 in which a spring 15 and detent pressure plate 16 is supported by means of a fluid tight tapered plug 17a screw-threaded in the outer end of the bore 14. The detent pressure plate 16 engages a ball 17 or spheroid member which serves as a detent for the alternating valve of the reciprocating actuator, as will hereinafter be described in detail.

The conduit casing 10 is provided with a bore 18 in which is concentrically fitted the valve cylinder 19. The valve cylinder 19 is provided with an external annular groove 20 which communicates with the fluid pressure inlet port 11 of the conduit casing 10. The annular groove 20 is a long groove which extends a considerable distance axially of the valve cylinder 19, all as shown best in Fig. 1 of the drawings.

The valve cylinder 19 is provided with internal bore 21 in which alternating valve member 22 reciprocates. This alternating valve member 22 is adapted to cover and uncover a plurality of ports 23 which extend from bore 21 to annular groove 20. Alternating valve member 22 at the opposite end of its stroke is adapted to cover and uncover a plurality of ports 24 which communicate with an annular groove 25 in the exterior of valve cylinder 19. Annular groove 25 communicates directly with the outlet port 12 in the conduit casing 10. Alternating valve member 22 is provided with a pair of axially spaced external peripheral grooves 26 and 27 which are arranged to be alternately engaged by the spheroid detent member 17 at opposite ends of the stroke of the alternating valve 22 axially of the bore 21 in the valve cylinder 19. This alternating valve 22 is a hollow cylindrical member having an inwardly directed annular ledge 28 near its one end which is engaged by a triangular valve pressure plate 29.

Near the opposite end of the alternating valve member 22 is an inwardly directed ledge 30 engaged by a triangular valve pressure plate 31, all as shown best in Fig. 1 of the drawings. A spring 32 is disposed intermediate the valve pressure plates 29 and 31 and tends to maintain them against their respective abutments formed by the inwardly directed ledges 28 and 30 of the alternating valve 22.

The valve pressure plates 29 and 31 are provided with respective bore portions 33 and 34 through which a rod portion 35 of the motor piston 36 extends. The rod portion 35 is provided with an enlarged head 36a on its extending end and an enlarged shoulder portion 37 spaced therefrom and adapted to engage the valve pressure plate 29. The distance between the head 36a and shoulder 37 is substantially greater than the distance between the ledges 28 and 30 which are engaged by the valve pressure plates 29 and 31, respectively. This arrangement provides for an over-running stroke operation of the piston 36 relative to the alternating valve 22 during each stroke in each direction as the piston 36 traverses a bore 38 in a cylinder 39 in which the piston 36 is reciprocally mounted.

Fixed to the piston 36 is a rod portion 40 having a cross-sectional area equal to substantially half the area of the piston 36, or which may be in any other desired proportion, as will be hereinafter described in detail.

The rod 40 is reciprocally mounted in a reduced bore 41 in the end of the cylinder 39 and is engaged by a peripheral seal 42.

The cylinder 39 is secured by means of screw-threads 43 within the end of the valve cylinder 19 and a seal 44, which may be a conventional O-ring, is disposed in a groove 45 near the end of the cylinder 39 and inwardly of a cap flange 46 integral therewith.

The seal 44 engages an internal semi-grooved portion in the end of the valve cylinder 19, all as shown best in Fig. 1 of the drawing.

It will be seen that the piston cylinder 39 is provided with an axially elongated groove in its exterior. This groove 47 communicates with a plurality of ports 48 in the valve cylinder 19 which in turn communicate with the annular groove 20 therein. The piston cylinder 39 is provided with a plurality of ports communicating with its bore portion. These ports are designated 49 and they also communicate with the groove 47 which in turn communicates through the ports 48 with the groove 20 and the fluid pressure inlet port 11.

The valve cylinder 19 is provided with external grooves containing seal members 50 and 51 which are disposed at opposite ends of the groove 20 to effectively seal fluid leakage therefrom between the valve cylinder 19 and the conduit casing 10. Likewise, the valve cylinder 19 is provided with annular grooves containing seals 52 and 53 which are disposed at opposite ends of the groove 25 to prevent leakage of fluid intermediate the valve cylinder 19 and the conduit casing 10.

The cylinder 39 is provided with an external annular groove having a seal 54 therein which engages the bore 21 of the valve cylinder 19. This seal 54 prevents leakage of fluid from the bore 21 of the valve cylinder 19 into the annular groove 47 of the piston cylinder 39 or in the reverse direction, as the case may be.

A cylinder cap 55 is internally screw-threaded in one end of the valve cylinder 19 and is provided with an annular stop portion 56 arranged to limit movement of the alternating valve 22 in one direction. The end 57 of the piston cylinder 39 provides a stop to limit movement of the alternating valve 22 in the opposite direction. The cylinder cap 55 is provided with an internal recess 58 arranged to receive the enlarged end 36a of the shaft portion 35 while a groove 59 in the cylinder cap 55 contains a seal 60 which engages a semi-groove 61 in the end of the valve cylinder 19 to provide a seal arranged to prevent leakage through the interconnecting threads of the cylinder cap 55 and valve cylinder 19.

The cylinder cap 55 is provided with an extending flange 62 which engages the end 63 of the conduit casing 10 for maintaining the opposite end 64 thereof abutted against a shoulder 65 of the valve cylinder 19. Thus, the conduit casing 10 is maintained in precise axial position surrounding the valve cylinder 19 whereby registry of the inlet and exhaust ports 11 and 12 with the annular grooves 20 and 25 in the valve cylinder 19 may be positively maintained.

Attention is called to the piston 36 which is provided with an external groove 66 which retains a sealing member 67. It will be understood that various sealing members may be provided for piston 36 in accordance with design requirements and the reciprocal speed of operation and pressure of fluids employed to operate the same. Likewise, the sealing 42 may be employed as desired to accommodate certain conditions of operation. It is to be understood that any equivalent seal may be installed to match operating conditions as desired.

Attention is also called to the fact that conduit casing 10 and valve cylinder 19 may be fabricated in any manner desired. For example, they may be cast together as an integral unit having grooves 20 and 25 and ports 24 and 48 cast therein. It will also be noted that the opposite ends of conduit casing 10 may be welded to valve cylinder 19 providing a complete seal which would thus eliminate some of the seal elements, as shown in Fig. 1 of the drawings, and as hereinbefore described.

The operation of the fluid pressure self-reciprocating actuator in accordance with the present invention is substantially as follows:

When fluid under pressure is passing into the port 11, as indicated by the arrow "A" in Fig. 1 of the drawings, it passes inwardly through the annular groove 20 in the valve cylinder 19 and through the ports 23 to act upon the side of the piston 36 adjacent the alternating valve member 22.

It will be understood that fluid acting on the entire cross-section of the piston 36 at its side facing the valve member 22 overcomes pressure which is exerted through the annular groove 20, ports 48 and 49 to act on the piston 36 surrounding the rod 40. The effective area of the piston surrounding the rod 40 is substantially half of the cross-sectional area of the piston 36, therefore, the piston 36 in the position as shown in Fig. 1 of the drawings will move in the direction of the arrow B in Figs. 1 and 5 of the drawings.

In the structure as presently disclosed, the effective area of the piston 36 surrounding the rod 40 is substantially half that of the cross-sectional area of the opposite surfaces of the piston 36; however, the proportional areas may be varied in order to design the present fluid reciprocating actuator to operate more rapidly in one direction than in the other, or to provide for more powerful actuation in one direction or the other, if desired.

It will be understood that when the piston 36 is moving in the direction of the arrow B, fluid passes outwardly through the ports 48 and 49 into the annular groove 20 while fluid passes inwardly through the ports 23 to the interior of the cylinder 38 and valve cylinder 19 surrounding the alternating valve 22.

Figure 6:
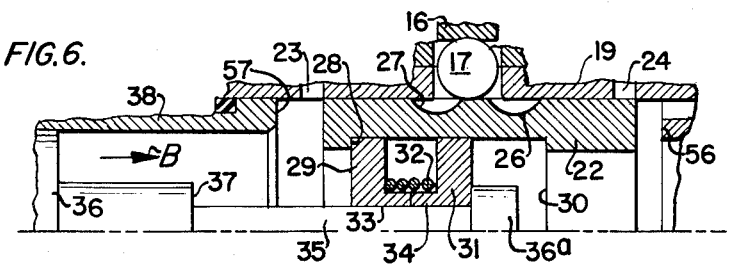
Fig. 6 is another view similar to Fig. 5 showing the actuator piston and alternating valve in another progressive position.

Referring to Fig. 5 of the drawings, it will be seen that when the piston 36 moves in the direction as indicated by the arrow B that the fluid flows inwardly through the ports 23 and that the head 36a of the reduced rod portion 35 engages the valve pressure plate 31. Further movement of the piston 36 in the direction of the arrow B, as shown in Fig. 6 of the drawings, causes the head 36a of the rod portion 35 to force the valve pressure plate 31 into engagement with the valve pressure plate 29 whereupon the spring 32 is compressed to its furthermost position.

Figure 7:
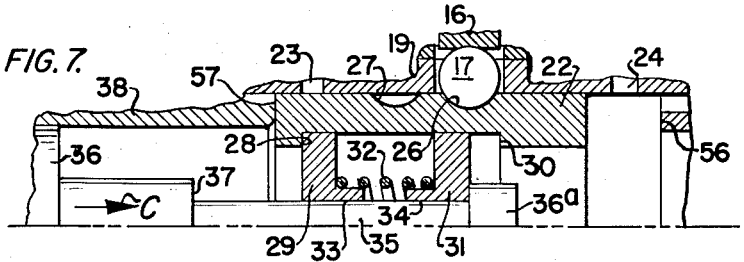
Fig. 7 is another view similar to Fig. 5 showing the actuator piston and alternating valve in another position, further progressed from that as shown in Fig. 6 of the drawings.

When the valve pressure plate 31 engages the valve pressure plate 29, it transmits positive force against the ledge 28 whereupon the alternating valve member 22 is slidably moved in the bore of the valve cylinder 19 in a direction as indicated by the arrow B. This movement causes the annular groove 27 to act in a cam fashion to eject the spheroid detent member 17 therefrom. When the spheroid detent member 17 is completely forced out of the groove 27, the spring 32 quickly shifts the alternating valve member 22 from the position as shown in Fig. 6 of the drawings to the position as shown in Fig. 7 of the drawings. At this instant the exhaust valve ports 24 are opened and the ports 23 are closed and the end of the alternating valve member 22 is abutted at the end 57 of the cylinder 38 which acts as a positive stop which coincides with the seating position of the spheroid dedent member 17 in the annular groove 16 of the alternating valve member 22.

It will be understood that the detent member 17 when in either of the annular groove 26 or 27 of the alternating valve member 22 serves to hold it in certain position until the spring 32 is sufficiently compressed to cause rapid shifting of the alternating valve 22 in order to effect positive flow reversal and pressure reversal of the fluid acting on the piston 36.

As shown in Fig. 7, the alternating valve 22, when shifted to uncover the exhaust ports 24 and close the pressure ports 23 causes fluid to flow through the annular groove 47 and 49 into the piston cylinder 39 around the rod 40.

Figure 8:
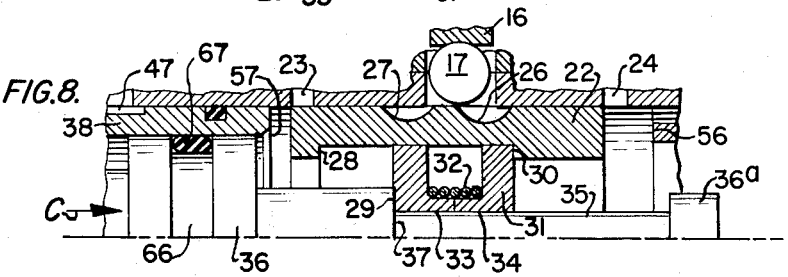
Fig. 8 is a still further view similar to Fig. 5 showing a position of the actuator piston and alternating valve progressed from the position as shown in Fig. 7 of the drawings.

Pressure acts to move the piston 36 in the direction of the arrow C in Fig. 7 of the drawings, while the fluid internally of the valve cylinder 19 passes outwardly through the ports 24, groove 25 and exhaust port 12. As the piston 36 progresses in the direction of arrow C, as shown in Fig. 8 of the drawings, the spheroid detent member 17 is forced by camming action out of the annular groove 26. At this time the spring 32 is compressed between the valve pressure plates 29 and 30 by action of the shoulder 37 of the piston 36 against the valve pressure plate 29 which causes it to engage the valve pressure plate 31 abutted to the ledge 30 of the alternating valve 22.

When the alternating valve 22 is in the position as shown in Fig. 8 of the drawings and the spheroid detent member 17 is fully disengaged from the annular groove 26, compression of the spring 32 is sufficiently forceful to quickly shift the alternating valve 22 into the position as shown in Fig. 5 of the drawings wherein the ports 23 are open and the exhaust ports 24 are closed. Fluid pressure then acts on both opposed surfaces of the piston 36 but due to the difference in effective area of the opposed surfaces the piston 36 again moves in the direction of the arrow B repeating its cycle.

The spheroid detent 17 is engaged by a rigid plate member 16 which transmits pressure of the spring 15 which is abutted to the plug 17, as shown in Fig. 1 of the drawings. The spring 15 furnishes sufficient force to provide detent operation for retaining the spheroid member 17 in either of the grooves 26 or 27 of the alternating valve 22, whereby the spring 32 is completely compressed before the alternating valve quickly shifts for pressure reversal operation on the piston 36. The triangular shape of the valve pressure plates 29 and 31 permits fluid to flow freely through the alternating valve 22 from the area of the piston 36 to the exhaust ports 24.

As shown in Figs. 1 and 5 of the drawings, the cylinder cap 55 is provided with a stop portion 56 engageable by the alternating valve 22 for retaining it in certain position to close the exhaust ports 24.

The stop 57, as hereinbefore described, controls the stroke limit of the valve 22 in the opposite direction.

It will be seen from an inspection of Fig. 1 of the drawings that the present fluid pressure self-reciprocating actuator in accordance with the present invention includes a housing structure composed of the conduit casing 10, valve cylinder 19, piston cylinder 47, and cap 55.

The piston 36 and alternating valve 22 and its connected mechanism are all enclosed in the housing and will be lubricated by the motor fluid which enters the intake port 11 and passes outwardly through the exhaust port 12. This arrangement provides for a very durable structure, the maintenance of which requires minimum attention. It will be understood that the speed of reciprocation cycling of the piston 36 may be controlled by the sizes of the various ports and the operating pressures of the motor fluid, and, as hereinbefore described, a variety of stroke speeds may be attained in either directional movement by the piston 36 according to the ratio of opposed effective areas thereof acted upon by the motive fluid.

Having thus described the invention and the present embodiments thereof it is desired to emphasize the fact that many modifications may be resorted to in a manner limited only by a just interpretation of the subject matter and claims.

I claim:

1. In a fluid pressure self-reciprocating actuator, a piston, a housing in which said piston is reciprocally mounted, an alternating valve axially aligned with and operable by said piston when reciprocating, said housing having inlet and outlet ports for conducting motive fluid under pressure and arranged to communicate with opposite ends of said alternating valve and said piston internally of said housing, said piston having respectively greater and lesser effective areas on its opposite ends and passage means communicating with said inlet arranged to concurrently communicate with both ends of said piston when it is moving in one direction, said alternating valve having a passage axially therethrough to conduit fluid, exhausted from said greater effective area, to said outlet port.

2. In a fluid pressure self-reciprocating actuator, a piston, a housing in which said piston is reciprocally mounted, an alternating valve axially aligned with and operable by said piston when reciprocating, said housing having inlet and outlet ports for conducting motive fluid under pressure and arranged to communicate with opposite ends of said alternating valve and said piston internally of said housing, said piston having respectively greater and lesser effective areas on its opposite ends and passage means communicating with said inlet arranged to concurrently communicate with both ends of said piston when it is moving in one direction, said alternating valve having a passage therethrough to conduit fluid, exhaust from said greater effective area, to said outlet port, said alternating valve arranged to concurrently open said outlet port and to shut off flow of fluid through said passage means to one end of said piston.

3. In a fluid pressure self-reciprocating actuator, a piston, a housing in which said piston is reciprocally mounted, an alternating valve axially aligned with and operable by said piston when reciprocating, said housing having inlet and outlet ports for conducting motive fluid under pressure and arranged to communicate with opposite ends of said alternating valve and said piston internally of said housing, said piston having respectively greater and lesser effective areas on its opposite ends and passage means communicating with said inlet arranged to concurrently communicate with both ends of said piston when it is moving in one direction, said alternating valve having a passage therethrough to conduit fluid, exhaust from said greater effective area, to said outlet port, said alternating valve arranged to concurrently open said outlet port and to shut off flow of fluid through said passage means to one end of said piston, said one end of said piston having said greater effective area than the opposite end thereof.

4. In a fluid pressure self-reciprocating actuator, a piston, a housing in which said piston is reciprocally mounted, an alternating valve axially aligned with and operable by said piston when reciprocating, said housing having inlet and outlet ports for conducting motive fluid under pressure and arranged to communicate with opposite ends of said alternating valve and said piston internally of said housing, said piston having respectively greater and lesser effective areas on its opposite ends and passage means communicating with said inlet arranged to concurrently communicate with both ends of said piston when it is moving in one direction, said alternating valve having a passage therethrough to conduit fluid, exhaust from said greater effective area, to said outlet port, said alternating valve arranged to concurrently open said outlet port and to shut off flow of fluid through said passage means to one end of said piston, said one end of said piston having said greater effective area than the opposite end thereof, said alternating valve having detent means arranged to hold it in either of two positions and provided with spaced pressure plates abutted thereto in opposite directions, a spring intermediate said pressure plates tending to force them apart and into engagement with abutted portions of said alternating valve and means connected with said piston having abutment portions cooperatively engageable with said pressure plates and spaced apart a substantially greater distance than the extreme spacing of said pressure plates.

5. In a fluid pressure self-reciprocating actuator, a piston, a housing in which said piston is reciprocally mounted, an alternating valve axially aligned with and operable by said piston when reciprocating, said housing having inlet and outlet ports for conducting motive fluid under pressure and arranged to communicate with opposite ends of said alternating valve and said piston internally of said housing, said piston having respectively greater and lesser effective areas on its opposite ends and passage means communicating with said inlet arranged to concurrently communicate with both ends of said piston when it is moving in one direction, said alternating valve having a passage therethrough to conduit fluid, exhaust from said greater effective area, to said outlet port, said piston having substantially half the effective area on the end having lesser area as compared to that of its opposite end having relatively greater area whereby said alternating valve is arranged to close said passage means communicating with the end of the piston having the largest effective area permitting fluid pressure to act on said piston with equal force in both directions of reciprocation thereof.

6. In a fluid pressure self-reciprocating actuator, a housing, a piston having opposed surfaces and reciprocally mounted therein, an alternating valve axially aligned with and operable by said piston, fluid inlet passage means communicating with both of said opposed surfaces of said piston, one of said opposed surfaces having greater area than the other, a source of fluid pressure communicating with said passage means, an exhaust passage for said housing communicating with the opposite end of said valve from said inlet passage, said alternating valve when moved in one direction by said piston arranged to open said exhaust passage and close a portion of said inlet passage means communicating with the surface of said piston having the greatest area, said alternating valve having a passage axially therethrough to conduit fluid, exhausted from said greater effective area to said outlet port, said alternating valve having a pair of detent portions, detent means stationary with respect to said housing engageable with the detent portions of said alternating valve for holding the same in either of two positions, said alternating valve having a pair of opposed abutment portions, opposed pressure plates engaging the opposed abutment portions, a spring intermediate said pressure plates and tending to hold them in engagement with said abutment portions, said piston having a rod provided with spaced engaging portions positioned farther apart than the greatest extended distance of said pressure plates from each other, said engaging portions of said piston adapted alternately to engage and force said pressure plates toward each other until they compress said spring and engage each other therebetween whereupon a detent portion of said alternating valve member is shifted out of engagement with said detent member permitting said spring quickly to shift said alternating valve member wherein the other detent portion thereof engages said detent member causing rapid reversal of fluid pressure on the opposed surfaces of said piston.

7. In a fluid pressure self-reciprocating actuator, a piston, a housing in which said piston is reciprocally mounted, an alternating valve axially aligned with and operable by said piston when reciprocating, said housing having inlet and outlet ports for conducting motive fluid under pressure and arranged to communicate with opposite ends of said alternating valve and said piston internally of said housing, said housing including an external conduit casing, a concentric valve cylinder inwardly thereof in which said alternating valve member reciprocates and a concentric piston cylinder internally of said valve cylinder in which said piston is reciprocally mounted.

8. In a fluid pressure self-reciprocating actuator, a piston, a housing in which said piston is reciprocally mounted, an alternating valve axially aligned with and operable by said piston when reciprocating, said housing having inlet and outlet ports for conducting motive fluid under pressure and arranged to communicate with opposite ends of said alternating valve and said piston internally of said housing, said housing including an external conduit casing, a concentric valve cylinder inwardly thereof in which said alternating valve member reciprocates and a concentric piston cylinder internally of said valve cylinder in which said piston is reciprocally mounted, and annular groove passage means intermediate said valve cylinder and said conduit casing communicating with said inlet and outlet ports.

9. In a fluid pressure self-reciprocating actuator, a piston, a housing in which said piston is reciprocally mounted, an alternating valve axially aligned with and operable by said piston when reciprocating, said housing having inlet and outlet ports for conducting motive fluid under pressure and arranged to communicate with opposite ends of said alternating valve and said piston internally of said housing, said housing including an external conduit casing, a valve cylinder inwardly thereof in which said alternating valve member reciprocates and a piston cylinder internally of said valve cylinder in which said piston is reciprocally mounted, and annular groove passage means intermediate said valve cylinder and said conduit casing communicating with said inlet and outlet ports, said piston cylinder having an external groove therein communicating with one of said annular grooves which communicates with said inlet port, said second passage means also communicating with one end of said piston.

10. In a fluid pressure self-reciprocating actuator, a piston, a housing in which said piston is reciprocally mounted, an alternating valve operable by said piston when reciprocating, said housing having inlet and outlet ports for conducting motive fluid under pressure and arranged to communicate with said alternating valve and one end of said piston internally of said housing, said housing including an external conduit casing, a valve cylinder inwardly thereof in which said alternating valve member reciprocates and a piston cylinder internally of said valve cylinder in which said piston is reciprocally mounted, said valve cylinder having external grooves internally of said conduit casing communicating with said inlet and outlet ports, said piston cylinder having an external groove therein communicating with one of said annular grooves which communicates with said inlet port and provided with passages extending to one end of said piston, said annular groove in said valve cylinder, communicating with said inlet port, having additional ports communicating with the interior of said valve cylinder and the interior of said piston cylinder at the opposite end of said piston.

References Cited in the file of this patent

UNITED STATES PATENTS

| | | |
|---|---|---|
| 375,200 | Ross | Dec. 20, 1887 |
| 2,092,405 | Neveu | Sept. 7, 1937 |
| 2,398,229 | Kassouf | Apr. 9, 1946 |
| 2,406,747 | Davis | Sept. 3, 1946 |